A. EVERETT.
MACHINE FOR TURNING WOODEN BOWLS.
No. 7,523. Patented July 30, 1850.
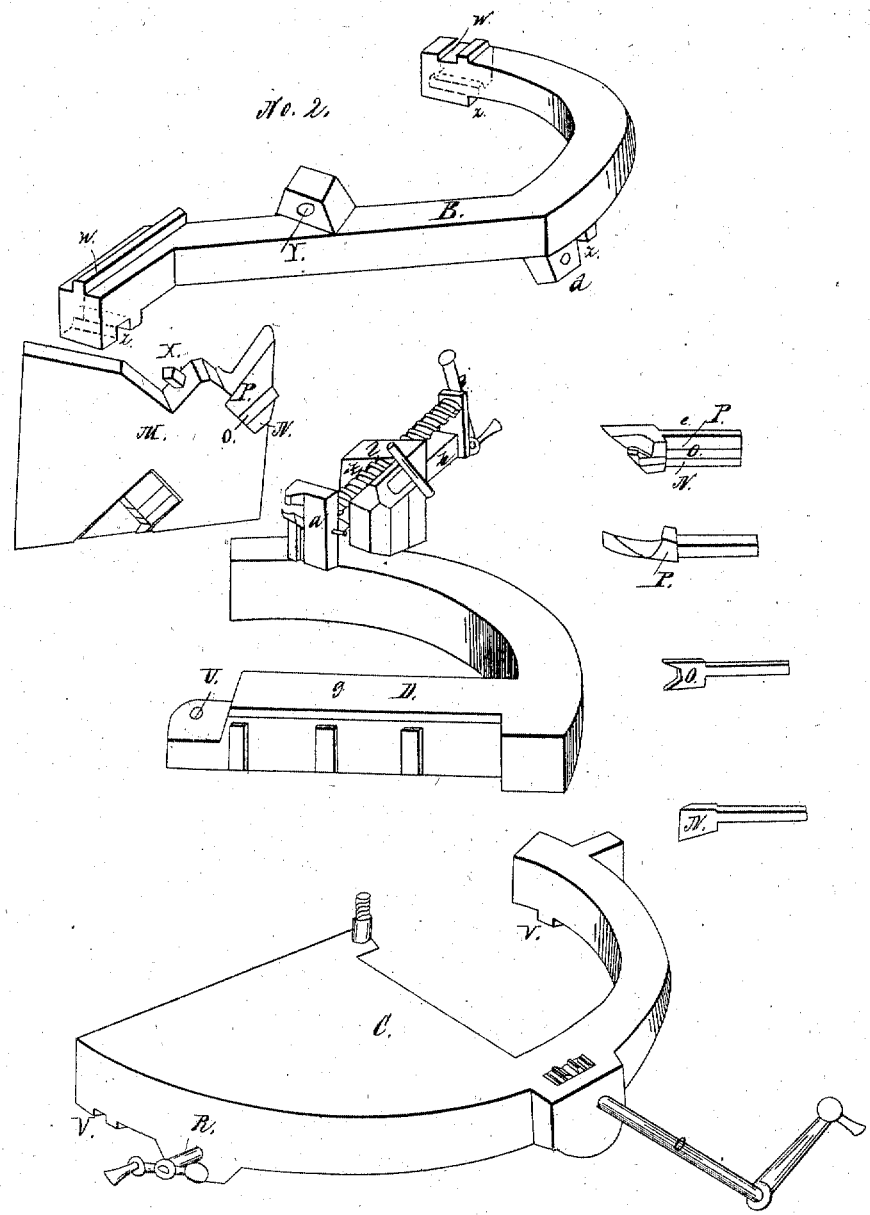

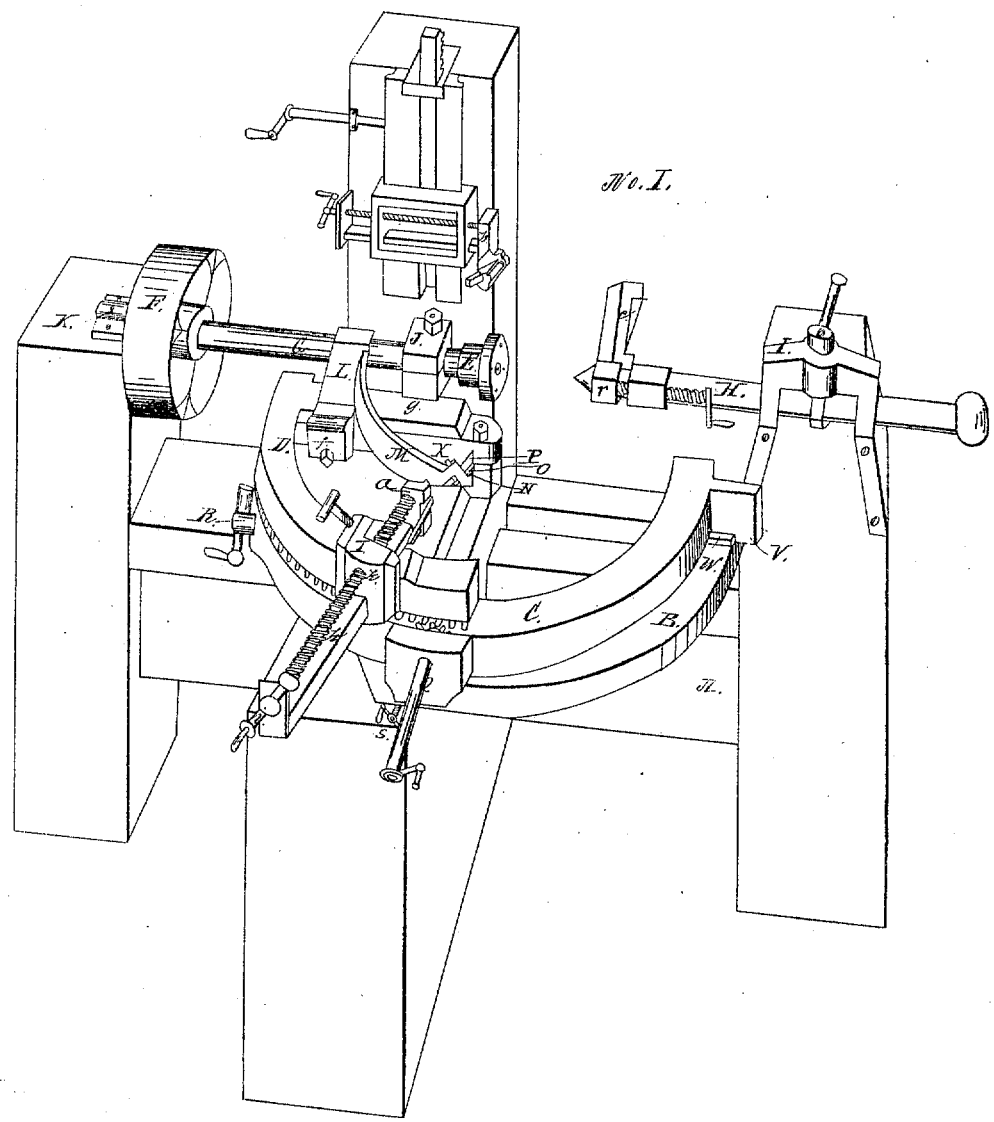

UNITED STATES PATENT OFFICE.

ADDISON EVERETT, OF MIDDLEFIELD, MASSACHUSETTS.

MACHINERY FOR TURNING OUT WOODEN BOWLS.

Specification of Letters Patent No. 7,523, dated July 30, 1850.

*To all whom it may concern:*

Be it known that I, ADDISON EVERETT, of Middlefield, in the county of Hampshire and State of Massachusetts, have invented a new and useful Machine for Turning Wooden Bowls; and I do hereby declare that the following is a full, clear, and exact description of the construction and operation of the same, reference being had to the annexed drawings, making a part of this specification, in which—

No. 1 is a perspective view; and No. 2 is a separate view of the different parts; the letters being for the same parts in all views.

The nature of my invention consists in turning wooden bowls from blocks of wood, by means of gouges, cutters, and spurs, fixed in strong movable frames, which are adjusted in such a manner as to insure a rapid and economical manufacture of bowls of any thickness or shape required; and in the simplicity of the cutters and spurs, which are easily made and sharpened.

A represents a strong frame of wood or iron, on which the machine is placed.

B is the lower part of the movable bottom frame, which is moved on slides which are fastened to the frame A. It is moved by the screw S, which is connected to the frame A and with B by the female screw, *d* the grooves that embrace the slides are seen at *z z z* the direction of the slides is at right angles with the spindle G.

C is the upper part of the movable bottom frame which slides on B in a direction parallel with the spindle G the slides and grooves of which are seen at V, V, and W W and is moved by the screw R which is connected to the lower movable bottom frame B, by a female screw seen at Y. I would here notice that the order of the slides on which the lower movable bottom frame B, and the upper movable frame C, are moved may be reversed, and produce the same result, causing the lower part of the movable bottom frame B, to slide in a direction parallel with the spindle G and the upper part of the movable frame C sliding at right angles with the spindle G. The form of the two parts of the movable bottom frame B and C may be varied, and not alter the principle of the movement.

The pivot T connects the upper movable bottom frame C, with the reciprocating frame D, at the center of motion U. The reciprocating frame D is made in the form of a circle or part of a circle with an arm *g* to which the curved cutter arm M, is connected by a clasp L, and screw *f* or other convenient manner; it is moved by means of cogs, on the periphery which are driven by a pinion and crank Q. The apparatus for shaping the outside of the curved part of the bowls, consisting of the end piece *a*, in which the gouge or cutter is fastened, the slide *h* which is a continuation of the end piece *a* and the screw *k* are connected with the reciprocating frame D by the head block *l*. M, is a curved cutter arm in which is fixed the cutter N, the spur O, the guard P, and the screw H. The cutter N is made nearly or quite straight with a shank which is adapted to the mortise in the end of the curved cutter arm M. The spur O presents two cutting points a little further apart than the length of the cutting edge of the cutter N it is made with a shank like that of the cutter N is placed on the top of the cutter N with the cutting points projecting beyond the cutting edge of N, and is also placed in the mortise in the end of the curved cutter arm M. The guard P regulates the thickness of the shavings; it is made in such a manner as to let the shavings pass by the side of it and pass out of the block on the upper side of the curved cutter arm M. It is formed with a shank of the same width of that of the cutter N, and that of the spur O it is placed in the mortise in the end of the curved cutter arm M on the spur O and the cutter N and the guard P, the spur O and the cutter N are fastened by the screw *x*, which is at right angles with the mortise in the end of the curved cutter arm M. The mortise in the end of the curved cutter arm M is made at an angle of 45 degrees, more or less, with the top of the curved cutter arm M; a lip projects beyond the upper end of the mortise on the lower side of the mortise, on which the wide part of the cutter N rests. For the different sized bowls which are taken from the same block of wood a different curve is required and consequently a different sized curved cutter arm M with its clasp L, cutter N, spur O, guard P, and screw H are required for each bowl or curve. If it is intended to cut off more than one bowl at a time, the clasp L can be made so as to hold any number of curved cutter arms M with their cutters N, &c.

G is a revolving spindle; F its pulley; E the chuck; H the sliding center; I the head block; J and H bearings for the spindle G.

b is the part of the machine for trimming the side of the block which forms the top of the bowls; it is pushed toward the block or bowl by a screw, and is moved upward by a rack and pinion which is operated by a crank; c, the apparatus for making the outside of the bottom of the bowls, is connected to the sliding center H and is moved by a screw and crank.

Having described the several part of the machine I now proceed to describe its operation. The chuck E, is taken from the spindle G, and fastened to the block of wood by two or more strong screws; it is then placed on the spindle G, the sliding center H is pushed against the other side of the block of wood and fastened; the reciprocating frame D is adjusted to the form of the block of wood by the movable bottom frames B and C; the spindle G is set in motion, which gives its motion to the block of wood which is fastened to the chuck E. The flat side of the block next the chuck is turned off by the double motion of the apparatus b, with its gouge. The circular part of the block which forms the outside of the bowl is brought into shape by the gouge or cutter, which is fixed in a, and brought in contact with the block by the screw k, and moved in a curve by the action of the crank and pinion Q, on the cogs on the periphery of the reciprocating frame D. The bottom of the bowl is shaped by pushing the frame c, with its cutter against the end of the block opposite the chuck E, by a crank and screws. The curved cutter arm M, with its cutting apparatus and its connecting piece L is then fastened on the reciprocating frame D. By turning the crank Q, the curved cutter arm M, with its cutting apparatus &c. is brought against the revolving block of wood, already shaped on the outside and is pushed into the block, until it reaches the center, when it is withdrawn, the center slide H slipped back, and the bowl is removed. The center slide H is then pushed against the remaining part of the block as at first, the bottom is shaped as before; the curved cutter arm M is removed from the reciprocating frame D, and another smaller sized curved arm M with its clasp L its cutters, &c., is placed on the reciprocating frame D, and a bowl a size smaller is cut from the remaining part of the block, and the different cutters are changed in like manner till the wooden block is used up.

What I claim as my invention and desire to secure by Letters Patent is—

1. The combination of the movable frames B and C with the reciprocating frame D, carrying the curved cutter arm M, connected and operating as described.

2. Also the combination of the curved cutter arms M, with the reciprocating frame D, for the purpose described; and also the cutter N, the spurs O, and the guards P, constructed as described, and connected and fastened to the curved cutter arms M, in the manner and for the purpose substantially as herein described.

ADDISON EVERETT.

Witnesses:
E. H. BREWSTER,
LAWRENCE SMITH.

7,523

*Disclaimer.*

*To the Commissioner of Patents:*

The petition of ADDISON EVERETT, of Middlefield, in the county of Hampshire and State of Massachusetts, respectfully represents that he has by assignment duly recorded in the Patent Office become the owner of the right for the United States to certain improvements in the manufacture of wooden bowls for which Letters Patent were granted to Parley Hutchens, jr., of Washington in the State of Massachusetts dated on the 25th day of September 1847; that he has reason to believe that through inadvertence and mistake the claim made in the specification of said Letters Patent is too broad including that of which the said patentee was not the first inventor. Your petitioner therefore hereby enters his disclaimer to the part of the claim in the aforesaid specification which is in the following words "the combination of the semicircular arm E with the knife frame F holding one or more knives, and adjustable piece T holding the gouge F for the purpose of turning wood bowls or dishes," which disclaimer is to operate to the extent of the interest of said Letters Patent vested in your petitioner who has paid ten dollars into the Treasury of the United States agreeably to the requirements of the act of Congress in that case made and provided.

ADDISON EVERETT.

June 26th 1850.

Witness:
   E. H. BREWSTER.